United States Patent Office 2,947,737
Patented Aug. 2, 1960

2,947,737

POLYMERIZATION OF CONJUGATED DIOLEFINES WITH A CATALYST COMPRISING METALLIC LITHIUM DISPERSED IN A CRYSTALLINE SALT

Richard S. Stearns, Akron, Ohio, assignor to The Firestone Tire & Rubber Company, Akron, Ohio, a corporation of Ohio No Drawing. Filed Feb. 8, 1956, Ser. No. 564,109

6 Claims. (Cl. 260—94.2)

This invention relates to the polymerization of conjugated diolefines and mixtures thereof with unsaturated compounds copolymerizable therewith to yield products in which the portions of the polymeric chains derived from the diolefines closely approximate the microstructure of Hevea rubber. Particularly when the diolefines are used in major proportions, and still more particularly when the diolefine employed is isoprene, the products closely approach, in technical properties and fundamental chemical and physical properties, natural Hevea rubber.

For many important uses, natural Hevea rubber is still the most satisfactory material, notwithstanding the extensive development of synthetic diene rubbers in recent years. Hevea rubber lends itself readily to fabrication processes, having excellent tack and other manipulative properties which facilitate manufacturing operations carried out thereon. Hevea rubber yields vulcanizates which are greatly superior to other diene rubber vulcanizates in point of tensile strength (particularly when the comparison is made with non-reinforced stocks), elongation at break, and low running temperature. These last properties have rendered Hevea rubber indispensable in large heavy duty tires such as truck tires.

These superiorities of Hevea rubber over the synthetic diene polymers heretofore produced appear fundamentally to be due to the extreme regularity of the mode of polymerization of the isoprene residues in Hevea rubber, these residues being almost exclusively in the cis-1,4-addition configuration, i.e. in units having the structural formula

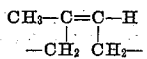

disposed along the polymer chain. Conventional synthetic diene polymers contain the diene residues in a variety of other configurations, the cis-1,4-addition mode usually constituting less than one-third of the entire structure.

It has been discovered, in an investigation in which the present applicant has been associated, that carefully purified isoprene, when polymerized by the action of metallic lithium, or other lithium-dependent catalyst, yields polyisoprenes having, in a large measure, the fundamental cis-1,4-addition structure of Hevea rubber. In general, these polymers will contain from 70% to 90% or more of the cis-1,4-addition structure. This structural similarity is reflected in a close approach of the properties of these synthetic isoprenes to properties of Hevea rubber. They are characterized by the excellent tack and building properties of Hevea rubber; and vulcanizates produced therefrom have tensile strength (even in non-reinforced stocks), elongation at break, and cool-running properties very nearly equalling those of Hevea rubber vulcanizates. However, these synthetic polyisoprenes fall slightly short of the properties of Hevea natural rubber, apparently because they still contain several percent of structures other than those resulting from cis-1,4-addition. It would therefore be highly advantageous to reduce this residual undesirable structure.

Accordingly, it is an object of this invention to provide a novel and advantageous method for the polymerization of conjugated diolefines.

Another object is to provide such a process which will result in the production of polymers having superior physical and chemical properties.

A further object is to provide such a process which will produce polymers having fundamental chemical structure and technical properties more closely approaching those of Hevea rubber than has heretofore been possible.

A still further object is to reduce the residual undesirable structure in the lithium catalyzed polymers above referred to.

Still another and very specific object is to produce a synthetic polymer of isoprene having fundamental structure and properties closely approaching those of Hevea rubber.

The above and other objects are secured, in accordance with this invention, in a process in which a conjugated diolefine or a mixture thereof with other unsaturated compounds copolymerizable therewith is contacted with a catalyst comprising metallic lithium colloidally dispersed and associated with a salt which is preferably a lithium salt, and still more preferably a lithium halide. The conjugated diolefine, or mixture containing the same, is thereby caused to polymerize, and, other factors being equal, the resultant polymers approach more closely to the ideal Hevea-rubber-type properties and chemical structure than is obtainable with the generality of lithium-dependent catalysts. Particularly when the diolefine used is isoprene, the properties of the polymer approach quite closely to those of Hevea natural rubber, having the excellent tack and working strength of Hevea rubber, and yielding vulcanizates characterized by the excellent tensile strength, elongation at break, and low internal friction properties of Hevea rubber.

The reaction may be carried out as a mass polymerization, in which the monomeric materials are contacted with the catalyst in substantially undiluted form, or as a solution polymerization in which the reactants are dissolved and/or dispersed in a suitable inert solvent. Depending on temperature and pressure, the monomers may be in liquid or vaporous state. The temperature may range from 0° to 150° C., preferably from 30° to 80° C.

THE DIOLEFINES EMPLOYED

Diolefines suitable for use in this invention include (the preferred) isoprene, butadiene, 2-methyl-1,3-pentadiene, 2,3-dimethyl butadiene, cyclopentadiene, and the like. It will be understood that mixtures of diolefines indicated as being satisfactory may also be used.

The diolefines employed this invention should be of a high degree of purity for use in the practice of this invention. By high purity is meant that the diolefine should be of at least more than 90 mole percent purity and preferably in the neighborhood of 95 or more mole percent purity. In general, the purer the diolefine, the faster the reaction rate and the closer the structure and the properties of the resulting polymer to natural rubber. Acetylenic compounds, or other compounds containing reactive hydrogen which tend to reduce the effective catalyst concentration or to act as chain terminators should be kept at a minimum or removed prior to use, since they use up catalyst and also tend to lower the molecular weight of the resulting polymer. Any inhibitor normally present in a commercial diolefine must be removed by conventional techniques prior to polymerization in accordance with the invention.

Excellent polymers in accordance with the invention are produced from Pure Grade [1] or Research Grade [2] isoprene. The only purification required of these monomers prior to use is removal of inhibitor therefrom. Desirable polymers in accordance with the invention are also produced from a less pure grade of isoprene [3] which has a purity of about 91–93% and contains minor amounts of alkyl acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to 1.4216. A final refinement which has been found particularly suitable consists in refluxing the isoprene with sodium or other alkali metal sand, and then distilling the isoprene away from the sand.

Moisture in the polymerization zone, since it tends to use up catalyst, should be kept at a minimum. Oxygen and other components of the atmosphere have been found to inhibit polymerization and consequently should as nearly as possible be kept out of the reaction zone. To this end it is desirable that the diolefines be handled at all times in contact only with their own vapors or with atmospheres containing only their own vapors and inert gases such as helium or argon. Particularly to be avoided is the presence of oxygenated and nitrogenous organic compounds such as ethers, esters, amines and the like, which are sometimes considered to be indispensable constituents of alkali-metal-based catalyst systems; these compounds should be rigorously excluded from the reaction mixtures of this invention.

SOLVENT SYSTEMS

The process of this invention may be carried out as a mass polymerization, in which the monomeric materials are contacted with the catalyst in substantially undiluted state, or may be carried out as a solution polymerization in which the reactants are dissolved and/or dispersed in a suitable inert solvent. Any solvent to be used in the process of this invention must be a non-polar, non-acidic organic solvent. Suitable solvents include the saturated aliphatic hydrocarbon solvents such as the straight and branched-chain paraffins and cycloparaffins containing from 3 to 16 carbon atoms, such as propane, pentane, hexane, heptane, dodecane, petroleum ether, cyclopentane, cyclohexane, methyl cyclohexane and the like. The same considerations as to purity and absence of interfering compounds apply to the solvents as to the monomeric isoprene. A treatment which has been found particularly advantageous for the purification of paraffin solvents such as petroleum ether consists in agitating them with concentrated sulfuric acid, and thereafter repeatedly washing them with water. The solvents may then be dehydrated by passage through a silica gel, alumina, calcium chloride or other dehydrating and adsorbing column, and thereafter distilling. Similarly as in the case of the isoprene, the solvent after purification should be handled in contact only with its own vapor or with atmospheres containing only its vapor and inert gases such as helium or argon.

COMONOMERS

As noted above, in addition to being polymerized alone, the diolefines may also be polymerized with minor proportions of other unsaturated compounds. In general, it is preferred that the copolymerized compounds should constitute not over 25%, based on the total weight of the diolefine plus the copolymerized compounds, as such polymers approach closest to the properties of Hevea rubber. However, in any copolymers produced by the process of this invention and containing a significant amount, say 10% or more, of a diolefine, the diolefine-derived portion of the polymer chain will possess a microstructure comparable to that of Hevea rubber, and will exhibit properties distinguishing it from comparable conventionally produced polymers. Compounds suitable for copolymerization with diolefines in the practice of this invention include polymerizable ethylenically unsaturated compounds such as styrene, alpha-methyl styrene, and the like. The comonomers should be free of ether, nitrile, nitro and other highly negative groups. It will be understood, of course, that the same rigid standards for purity should be maintained for the comonomers as for the diolefine and solvent.

THE CATALYSTS OF THIS INVENTION

The catalysts employed in accordance with this invention comprise metallic lithium colloidally dispersed and associated with a matrix of a solid salt. The metal will generally be dispersed in such extremely fine dispersion that it will impart a characteristic blue coloration to the salt matrix, indicating that the reduced metal atoms are dispersed in the crystal lattice of the salt matrix. Preferably the salt matrix is an alkali metal salt, and still more preferably a lithium halide such as lithium chloride. The dispersion of the lithium metal in association with the salt matrix may be effected in various ways. For instance, a lithium halide or other salt may be exposed to an electron beam or other radiation sufficiently energetic to reduce a portion of the lithium ions in the salt's crystal lattice. Somewhat the same effect may be secured by exposing a lithium salt such as lithium aluminum hexachloride or lithium aluminum tetraethyl to the action of a more electropositive material, for instance another alkali metal or a covalent derivative of another alkali metal such as an alkali metal hydrocarbon derivative. Likewise the catalyst may be obtained by a process converse to the above, in which metallic lithium is oxidized under somewhat hindered conditions to form the salt matrix. For instance, in the reaction of metallic lithium with alkyl, aryl or other hydrocarbon halides to form the hydrocarbon lithium, the lithium halide crystals formed contain metallic lithium dispersed in the lattices thereof, as indicated by a blue coloration. It will be understood that catalysts prepared in this way should be isolated from the organolithium compound so produced; the organolithium compound is itself a catalyst for the polymerization of diolefines, but the resultant polymers are slightly inferior to those produced by the catalysts of this invention in pure form. In general, at least about 10% of the organolithium compound should be removed from the reaction mixture in order that the superior action dispersed-lithium-containing salt may assert itself; and preferably the organolithium compound should be removed as completely as possible, as for example by repeated washing of the product with an organic solvent for the organolithium compound. The catalysts may also be prepared by electrolysis of fused lithium chloride under proper conditions. Another method comprises dissolving lithium metal and a lithium salt such as lithium chloride in liquid ammonia, and then evaporating the liquid ammonia.

As to the amount of catalyst to be used, there is obviously no theoretical minimum since, so long as there is present any of the catalyst, some polymerization must take place. Nor would there be any theoretical maximum, since the catalysis is heterogeneous and no concentration effects could come into play. A good working range would be from 0.01 to 1% of the catalyst, based on the weight of the monomers to be polymerized. With regard to the concentration of the reduced lithium metal in the catalyst, this would be extremely difficult to determine quantitatively: in general, if the amount of reduced lithium is within a range such as to impart a visually preceptible blue coloration to the salt matrix, the con-

---

[1] Supplied by Phillips Petroleum Company, Bartlesville, Oklahoma, and represented as having a purity of 99 mole percent and a refractive index at 20° C. of $n_D^{20}=1.422$.
[2] Supplied by Phillips Petroleum Company and represented as having a purity of 99.6 mole percent and a refractive index at 20° C. of $n_D^{20}=1.422$.
[3] Supplied by Enjay Company, Inc.

centration will be sufficient for use as a catalyst in accordance with this invention.

POLYMERIZATION AND POLYMER RECOVERY OPERATIONS

For small scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the isoprene to evaporate with the bottle loosely capped. The catalyst, which will usually be in the form of a readily flowable solution or suspension of the catalyst, is usually introduced last, just before sealing the crown cap. A hypodermic syringe is a convenient instrument for the handling of the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle or distributing the antioxidant, as an agent to destroy the catalyst, and causes the polymer to separate out from any solvent used in the polymerization mass. The separated polymer is then preferably washed with water on a roll mill, usually with addition of further stabilizing agents, and dried.

Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the isoprene and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature which will usually be maintained between 0° and 150° C., preferably between 30° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

THE INFRA-RED DATA

The data given hereinbelow as to the proportions of cis-1,4-; trans-1,4-; 1,2- and 3,4-additions in the products of this invention were determined by infra-red analysis. The relative amounts of the four structures named are found by means of measuring the intensities of the infra-red absorption bands at 8.85, 8.68, 10.98 and 11.25 microns for the four types of structures in the order given, and inserting these values into the equation:

$$D^i = e_1^i C_1 + e_2^i C_2 + e_3^i C_3 + e_4^i C_4$$

where $D^i$ = absorbance (optical density) of the polymer at wavelength $i$ $e_{1, 2, 3, \text{ or } 4}^i$ = the absorptivities of the several structures at wavelength $i$, the subscripts 1, 2, 3 and 4 referring to the several component structures, and $C_{1, 2, 3, \text{ or } 4}$ = the concentrations of the several structures, the subscripts 1, 2, 3 and 4 referring to the several component structures.

The four equations obtained in this way are solved for $C_1$, $C_2$, $C_3$ and $C_4$, the values of the concentrations of the cis-1,4- trans-1,4-, 1,2-addition and 3,4-addition components of the polymer.

The peak wavelengths selected, and the values of the absorptivities $e^i$ for these wavelengths for the several structures, are tabulated herewith:

|  | Molar Absorptivities $e^i$ at Wavelength of— | | | |
| --- | --- | --- | --- | --- |
|  | 8.68 microns | 8.85 microns | 10.98 microns | 11.25 microns |
| 1,2-Addition | 3.531 | 3.531 | 149.0 | 10.199 |
| 3,4-Addition | 1.541 | 1.815 | 7.363 | 145.0 |
| Cis-1,4-Addition | 3.583 | 6.518 | 1.860 | 1.530 |
| Trans-1,4-Addition | 5.927 | 1.934 | 2.277 | 1.885 |

Percentage values for the various types of addition products, based on the total polymer, are derived by dividing the absolute concentration of each type of component by the sum of the concentrations of the four types of components (1,2-; 3,4-; cis-; and trans-) determined and multiplying by 100%, so that the sum of the percentages given will always be 100%. In order to assess the accuracy of the determination, total unsaturation is found; this is the quotient of the sum of the concentrations of the various components found by infra-red analysis, divided by the concentration of the solution used in the analysis which is found by determining the total solids.

With the foregoing general description in mind, there is given herewith a detailed example of the practice of this invention. All parts given are by weight.

Example

A. PREPARATION OF CATALYST

| | |
|---|---|
| Amyl chloride | 19.9 grams (.1875 mole). |
| Lithium paste (35% dispersion in white petrolatum) | 9.9 grams (.5 mole Li). |
| Petroleum ether | 900 ml. |
| Butyl iodide | 2 ml. |
| Lithium amyl solution (previously prepared in n-pentane, containing 0.001 g. Li per ml.) | 20 ml. |
| Iodine | Several crystals. |

The above recipe provides a 25% excess of lithium metal in reacting with amyl chloride to produce lithium amyl. The apparatus used for the preparation comprised a one-liter three-necked flask having a high-speed stirrer, a dropping funnel and a reflux condenser on the respective three necks. The stirrer was provided with an inlet for introducing helium into the interior of the flask. The apparatus was flamed and flushed with helium for 30 minutes before charging. A constant small stream of helium was continuously passed into the reactor during the reactions described hereafter.

The lithium dispersion, 850 ml. of the petroleum ether, 2 ml. of amyl chloride, the butyl iodide, pre-prepared amyl lithium and iodine were all charged into the flask at the outset to set up reaction initiating conditions. Stirring was commenced, the temperature adjusted to 30° C., and the balance of the amyl chloride and petroleum ether were mixed together and introduced dropwise through the funnel over the course of an hour. Stirring was continued for an additional hour to carry the reaction as far to completion as possible. There resulted a suspension of lithium chloride and associated lithium metal in a solution of lithium amyl. The suspension was allowed to settle, the liquid was decanted, and the residue washed and decanted five times with 700 ml. portions of n-pentane. The residue comprised a finely granulated lithium chloride and associated lithium metal, the residue having the overall blueish cast typical of lithium salts having lithium metal intruding into the crystal lattices thereof. The residue was made up into a suspension in n-pentane and diluted so as to contain .0028 g. of acid-titratable lithium per ml.

B. POLYMERIZATION

Isoprene _____ grams__ 40
Catalyst suspension (prepared as just described)_ml__ 10

The above ingredients were charged into an 8-ounce beverage bottle which had previously been flamed and flushed with helium. The bottle was then placed on a polymerizer wheel and tumbled at 50° C. for 18 hours. At the end of this time, the bottle was cut open and the polymer milled with water on a wash mill. A small amount of antioxidant was also added on the wash mill. Infra-red examination of the polymer indicated that it contained 92.9 cis-1,4-; 0.0% trans-1,4-; 0.0% 1,2-; and 7.1% 3,4-unsaturated configurations, the total unsaturation found being 88.4%.

From the foregoing general description and detailed specific example, it will be seen that the present invention provides a novel process for the polymerization of isoprene, resulting in polymers having high percentages of desirable structural configurations therein.

What is claimed is:

1. Process which comprises contacting a substance, selected from the group consisting of conjugated diolefines and mixtures thereof with styrene and with alpha-methyl styrene, with a catalyst comprising a crystalline salt having reduced metallic lithium dispersed in the crystal lattice thereof so as to exhibit a blue coloration.

2. Process which comprises contacting isoprene with a catalyst comprising a crystalline salt having reduced metallic lithium dispersed in the crystal lattice thereof so as to exhibit a blue coloration.

3. Process which comprises contacting a substance, selected from the group consisting of conjugated diolefines and mixtures thereof with styrene and with alpha-methyl styrene, with a catalyst comprising a lithium halide having reduced metallic lithium dispersed in the crystal lattice thereof so as to exhibit a blue coloration.

4. Process which comprises contacting a substance, selected from the group consisting of conjugated diolefines and mixtures thereof with styrene and with alpha-methyl styrene, with a catalyst comprising a lithium halide having reduced metallic lithium dispersed in the crystal lattice thereof so as to exhibit a blue coloration, said catalyst having been produced by the reaction of a hydrocarbon halide with lithium metal.

5. Process which comprises contacting isoprene with a catalyst comprising a lithium halide having reduced metallic lithium dispersed in the crystal lattice thereof so as to exhibit a blue coloration.

6. Process which comprises contacting isoprene with a catalyst comprising a lithium halide having reduced metallic lithium dispersed in the crystal lattice thereof so as to exhibit a blue coloration, said catalyst having been produced by the reaction of a hydrocarbon halide with lithium metal.

References Cited in the file of this patent

UNITED STATES PATENTS 1,058,056   Harries _____ Apr. 8, 1913

FOREIGN PATENTS 342,107   Great Britain _____ Jan. 29, 1931